United States Patent
Kirk et al.

(10) Patent No.: US 6,333,744 B1
(45) Date of Patent: Dec. 25, 2001

(54) GRAPHICS PIPELINE INCLUDING COMBINER STAGES

(75) Inventors: David B. Kirk, San Francisco; Matthew Papakipos, Palo Alto; Shaun Ho, Cupertino; Walter Donovan, Milpitas; Curtis Priem, Fremont, all of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/273,975

(22) Filed: Mar. 22, 1999

(51) Int. Cl.$^7$ ..................................................... G06T 1/20
(52) U.S. Cl. .............................................................. 345/506
(58) Field of Search ..................................... 345/425–431, 345/506

(56) References Cited

U.S. PATENT DOCUMENTS

| | | | |
|---|---|---|---|
| 4,866,637 | * | 9/1989 | Gonzalez-Lopez et al. ........ 364/518 |
| 5,230,039 | * | 7/1993 | Grossman et al. ................... 395/130 |
| 6,166,748 | * | 12/2000 | Van Hook et al. ................... 345/522 |

* cited by examiner

Primary Examiner—Almis R. Jankus
Assistant Examiner—G. F. Cunningham
(74) Attorney, Agent, or Firm—Girard & Equitz LLP (57) ABSTRACT

A graphics pipeline including a rasterizing stage producing diffuse color values; a plurality of texture stages producing texture values defining a particular texture; a combiner stage for combining four of a plurality of selectable input values including diffuse color values, texture values furnished by a plurality of texture stages, and proportions for combination of the selectable input values; the combiner stage being capable of providing a result equivalent to a sum of products of any two sets of input values, and a product of two input values.

21 Claims, 5 Drawing Sheets

GRAPHICS PIPELINE INCLUDING COMBINER STAGES

BACKGROUND OF THE INVENTION

1. Field of the Invention

This invention relates to computer display systems and, more particularly, to methods and apparatus for providing an improved graphics accelerator capable of more rapidly producing multitextured three dimensional output images.

2. History of the Prior Art

In three dimensional graphics, surfaces are typically rendered by assembling a plurality of polygons in a desired shape. The polygons are conventionally triangles having vertices which are defined by three dimensional coordinates in world space, by color values, and by texture coordinates.

The surfaces represented by an assembly of polygons are, as a generality, being viewed in perspective. To display a surface on a computer monitor, the three dimensional world space coordinates are transformed into screen coordinates in which horizontal and vertical values (x, y) define screen position and a depth value z determines how near a vertex is to the screen and thus whether that vertex is viewed with respect to other points at the same screen coordinates. The color values define the brightness of each of red/green/blue (r, g, b) color at each vertex and thus the color (often called diffuse color) at each vertex. Texture coordinates (u, v) define texture map coordinates for each vertex on a particular texture map defined by values stored in memory.

A texture map typically describes a pattern to be applied to the surface of the triangle to vary the color in accordance with the pattern. The texture coordinates of the vertices of a triangular surface area fix the position of the vertices of the triangle on the texture map and thereby determine the texture detail applied to each portion of the surface within the triangle in accordance with the particular texture . In turn, the three dimensional coordinates of the vertices of a triangle positioned on the texture map define the plane in which the texture map and the surface lie with respect to the screen surface.

A texture which is applied to a surface in space may have a wide variety of characteristics. A texture may define a pattern such as a stone wall. It may define light reflected from positions on the surface. It may describe the degree of transparency of a surface and thus how other objects are seen through the surface. A texture may provide characteristics such a dirt and scratches which make a surface appear more realistic. A number of other variations may be provided which fall within the general description of a texture. In theory, a number of different textures may be applied to any triangular surface.

Prior art graphics accelerators which are capable of applying multiple textures to a triangle typically progress through a series of steps is which pixels describing each triangle are first generated, a first texture is mapped to the triangle using the texture coordinates, texels describing the variation of each pixel in the triangle for the first texture are generated, the texels describing the first texture and the pixel colors describing the triangle are blended, and the resulting triangle is blended with any image residing in a frame buffer from which the image may be presented on an output display. Then, a second texture is mapped to the same triangle, the texels for the additional texture are generated, and the resulting texels are again blended with the pixel colors. Finally, the triangle blended with the second texture is blended into the image residing in the frame buffer.

As is known to those skilled in the art, the need to transit the graphics pipeline for each texture applied to the surface of each triangle defining an output image slows the process drastically. In many cases involving rapidly changing images, it has limited significantly the number of textures which can be applied. For this reason, a more recent development provides a pair of texture stages and a pair of texture blending stages in the pipeline. The first texture stage provides texture values describing a first texture at each pixel generated by the rasterizer which is blended with the pixel color values at the first texture blending stage. The output of the first texture blending stage is then furnished to the second texture blending stage along with texture values generated by the second texture stage. The output of the first texture blending stage and the texture values generated by the second texture stage are blended in the second texture blending stage and ultimately transferred to the frame buffer blender stage to be blended with the image data already in the frame buffer. This more advanced pipeline allows two textures to be blended with a surface in a single pass through the graphics pipeline.

Although this most recent development is useful in accelerating texture blending in a graphics pipeline, it is limited to producing a single pixel having at most two textures during any clock of the graphics pipeline and cannot be utilized for any other purposes. For example, if more than two textures are to be mapped to a surface, the additional textures require that the graphics pipeline be traversed again. The texture blending stages are capable of texture blending only, more complicated functions require the use of the host processor and the frame buffer blending stage and drastically slow the rendering of surfaces by the graphics accelerator.

It is desirable to provide a new computer graphics pipeline capable of both rendering triangles including multiple textures defining images on an output display and accomplishing a plurality of other functions without slowing the graphics pipeline.

SUMMARY OF THE INVENTION

The present invention is realized by a graphics pipeline comprising a rasterizing stage capable of producing diffuse color values for each pixel defining a surface; a plurality of texture stages producing texture values each defining a particular texture to be applied to a surface; a combiner stage for combining a plurality of selectable input values including diffuse color values, texture values furnished by a plurality of texture stages, and proportions for combination of the selectable input values; the combiner stage being capable of selectably providing results equivalent to a sum of products of any two sets of input values.

These and other features of the invention will be better understood by reference to the detailed description which follows taken together with the drawings in which like elements are referred to by like designations throughout the several views.

DETAILED DESCRIPTION

Figure 1:
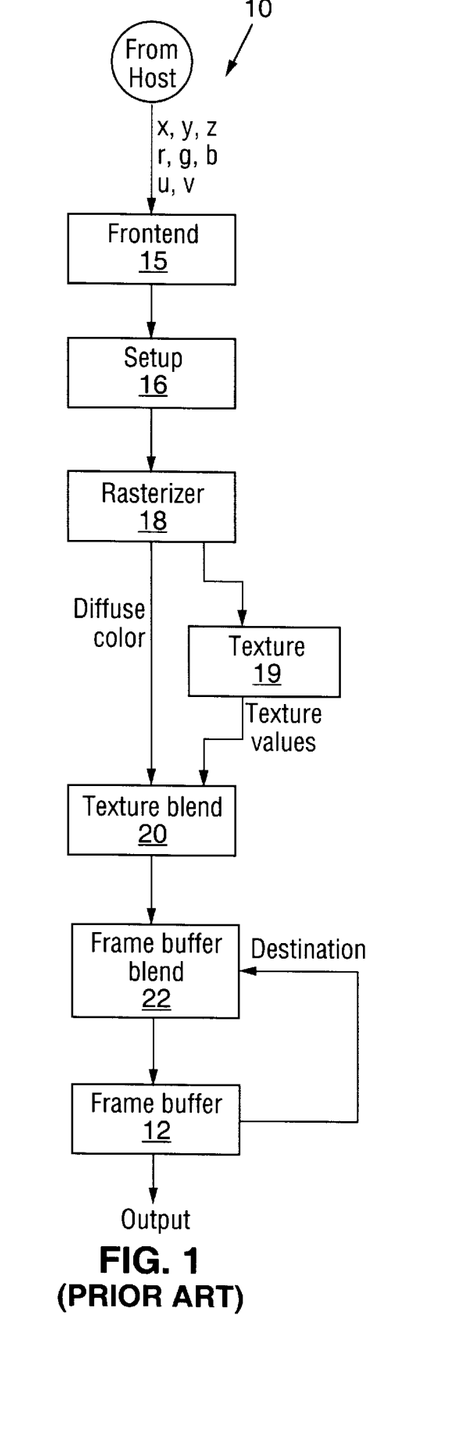
FIG. 1 is a block diagram illustrating a computer graphics pipeline designed in accordance with the teaching of the prior art.

Referring now to FIG. 1, there is illustrated a block diagram of a computer graphics pipeline 10 constructed in accordance with the prior art. The pipeline 10 includes a plurality of stages for rendering pixels defining a three dimensional image to a frame buffer 12 from which the image may be provided at an output stage 13, typically an output display.

The pipeline 10 includes a front end stage 15 at which data positioning each a plurality of triangles defining an output image is received and decoded. The front end stage 15 receives from an application program the data defining each of the vertices of each triangle to appear in the output image being defined in the frame buffer 12. This data may include the three dimensional world coordinates of each of the vertices of each triangle, red/green/blue color values (diffuse color values) at each of the vertices, and texture coordinates fixing positions on a texture map for each of the vertices for each texture modifying the color values of each triangle.

The front end stage 15 determines the manner and order in which the pixels defining a triangle will be processed to render the image of the triangle. When this processing order has been determined, the front end stage 15 passes the data defining the vertices of the triangle to a setup stage 16. The setup stage 16 carries out a number of processes known to those skilled in the art that make the operations of generating pixels and applying textures to those pixels progress rapidly. The processes actually carried out by the setup stage 16 may vary depending on the particular implementation of the graphics accelerator. In some circuitry, certain of these processes are implemented by a rasterizer stage 18 and a texture stage 19 which follow the setup stage or by the host central processing unit.

The setup stage 16 utilizes the world space coordinates provided for each triangle to determine the two dimensional coordinates at which those vertices are to appear on the two dimensional screen space of an output display. If the vertices of a triangle are known in screen space, the pixel positions vary linearly along scan lines within the triangle in screen space and may be determined. The setup stage 16 and the rasterizer stage 18 together use the three dimensional world coordinates to determine the position of each pixel defining each of the triangles. Similarly, the color values of a triangle vary linearly from vertex to vertex in world space. Consequently, setup processes based on linear interpolation of pixel values in screen space, linear interpolation of depth and color values in world space, and perspective transformation between the two spaces will provide pixel coordinates and color values for each pixel of each triangle. The end result of this is that the rasterizer stage generates in some sequence red/green/blue color values (conventionally referred to as diffuse color values) for each pixel describing each triangle.

The setup stage 16 and the rasterizer stage 18 also cooperate in the computation of the texture coordinates of each pixel in each triangle and send those texture coordinates to a texture stage 19. The texture coordinates vary linearly from vertex to vertex in world space. Because of this, texture coordinates at any position throughout the triangle may be determined in world space and related to the pixels to be displayed on the display through a process of perspective transformation. The texture coordinates are then utilized by the texture stage 19 to index into a selected texture map to determine texels (texture color values at the position defined by the texture coordinates for each pixel) to vary the diffuse color values for the pixel. Often the texture stage 19 interpolates texels at a number of positions surrounding the texture coordinates of a pixel to determine a texture value for the pixel. The end result of this is that the texture stage 19 generates in some sequence a texture value for each pixel describing each triangle.

The results of the rasterizer and texture stages 18 and 19 are furnished to a texture blending stage 20 in which the diffuse color values generated by the rasterizer for each pixel are blended with the texel value for the pixel in accordance with some combinatorial value often referred to as alpha. Typically, an alpha value is one of the values furnished with the triangle vertices which is interpolated and carried as a component of the texture values. Typically, an alpha value determines the amounts of each of the diffuse color values and the texture values which are to be included in the final color defining each pixel. The output of the texture blending stage 21 is a sequence of color values defining the pixels of the particular triangle with a first texture.

Although other stages (not shown) may be included in the pipeline for other effects, the sequence of color values defining the pixels of the particular triangle blended with a first texture generated by the texture blend stage 20 are transferred to a frame buffer blending stage 22. In the frame buffer blending stage, the sequence of color values defining the pixels of the particular triangle blended with a first texture are combined with the pixels already in the frame buffer 12 at the screen position of the triangle in a read/modify/write operation. Then, the color values for the pixels produced by the frame buffer blend stage 22 are stored in the frame buffer 12 replacing the values previously at the pixels positions defining the triangle.

If only one texture stage and only one texture blending stage are included in the graphics pipeline, then in order to apply an additional texture to the triangle, the pipeline must be traversed a second time. In this second traversal, the rasterizer stage 18 is again utilized to provide the pixels defining the diffuse color output of the triangle and texture coordinates related to a second texture map defining the second texture. The texture coordinates are utilized by the texture stage 19 to produce a second texture value output related to the individual pixels in the triangle. The second set of texture values produced by the texture stage 19 are then blended with the diffuse color values produced by the rasterizer in the texture blending stage 20. Finally, the destination pixel color values in the frame buffer 12 defining the triangle with a first texture are read out of the frame buffer and combined in the frame buffer blend stage 22 with the pixels providing the second texture for the triangle typically utilizing alpha values associated with the second texture values. The result then replaces the destination pixel color values in the frame buffer 22.

As will be obvious to those skilled in the art, the time required to overlay the pixels of a triangle with two sets of texture values is very significant. In fact, the time is so great that typically only a single texture is applied to any triangle unless the computer processing the images is very fast or the action of the image is quite slow.

Figure 2:
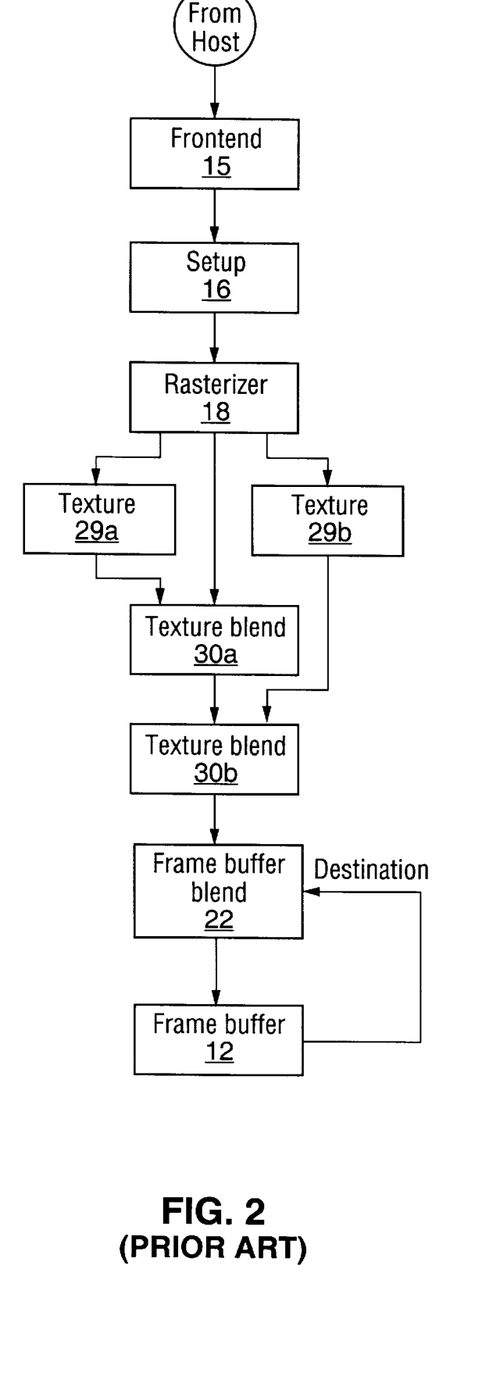
FIG. 2 is a block diagram illustrating another computer graphics pipeline designed in accordance with the teaching of the prior art.

Because of this, more advanced graphics pipelines have been designed. In the most advanced graphics pipelines known to the prior art, two texture stages 29a and 29b may be utilized as is illustrated in FIG. 2. In such a pipeline arrangement, each texture stage 29a and 29b provides texture values for a distinct one of two textures which are to be blended with the pixels of the triangle generated by the rasterizer stage 18. Thus, as individual diffuse colors are produced serially by the rasterizer stage to describe the pixels of a triangle, a texture value may be produced by each of the texture stages 29a and 29b to be blended with the pixel color.

A pair of texture blending stages 30a and 30b are also provided. The sequence of color values defining the pixels of the particular triangle are blended with texture values defining a first texture furnished by a first texture stage in the first texture blend stage 30a. The resulting sequence of color values are transferred to the second texture blending stage 30b and blended with the second sequence of texture values produced by the second texture stage 29b. The color values resulting from blending diffuse color values with one or two textures are ultimately transferred to a frame buffer blending stage 22 from the second texture blend stage 30b and combined with the pixels already in the frame buffer 12 at the screen position of the triangle in a read/modify/write operation. The color values for the pixels produced by the frame buffer blend stage 21 are stored in the frame buffer 12 replacing the values previously at the pixels positions defining the triangle. If more textures are to modify the surface, the graphics pipeline must be traverse additional times.

Although the advanced prior art pipeline illustrated in FIG. 2 is capable of producing a stream of pixels defining a surface with two textures in a single pass through the pipeline, this is all that the pipeline is able to accomplish. It is desirable to provide a graphics accelerator which is able to accomplish many more functions than simply blending two textures to each pixel of a surface being rendered as those pixels are sequentially generated.

The present invention provides a graphics pipeline that fulfills these requirements. To accomplish this, the present invention provides a new graphics pipeline having a number of new processing stages. These new processing stages allow texture values for a plurality of different textures to be processed simultaneously through the graphics pipeline thereby significantly accelerating the rendering of graphics images. As will be understood from the following description, the new pipeline allows a plurality of other operations which were not possible with prior art pipelines to be accomplished. Ultimately, the new pipeline is faster and much more flexible than are prior art graphics pipelines.

Figure 3:
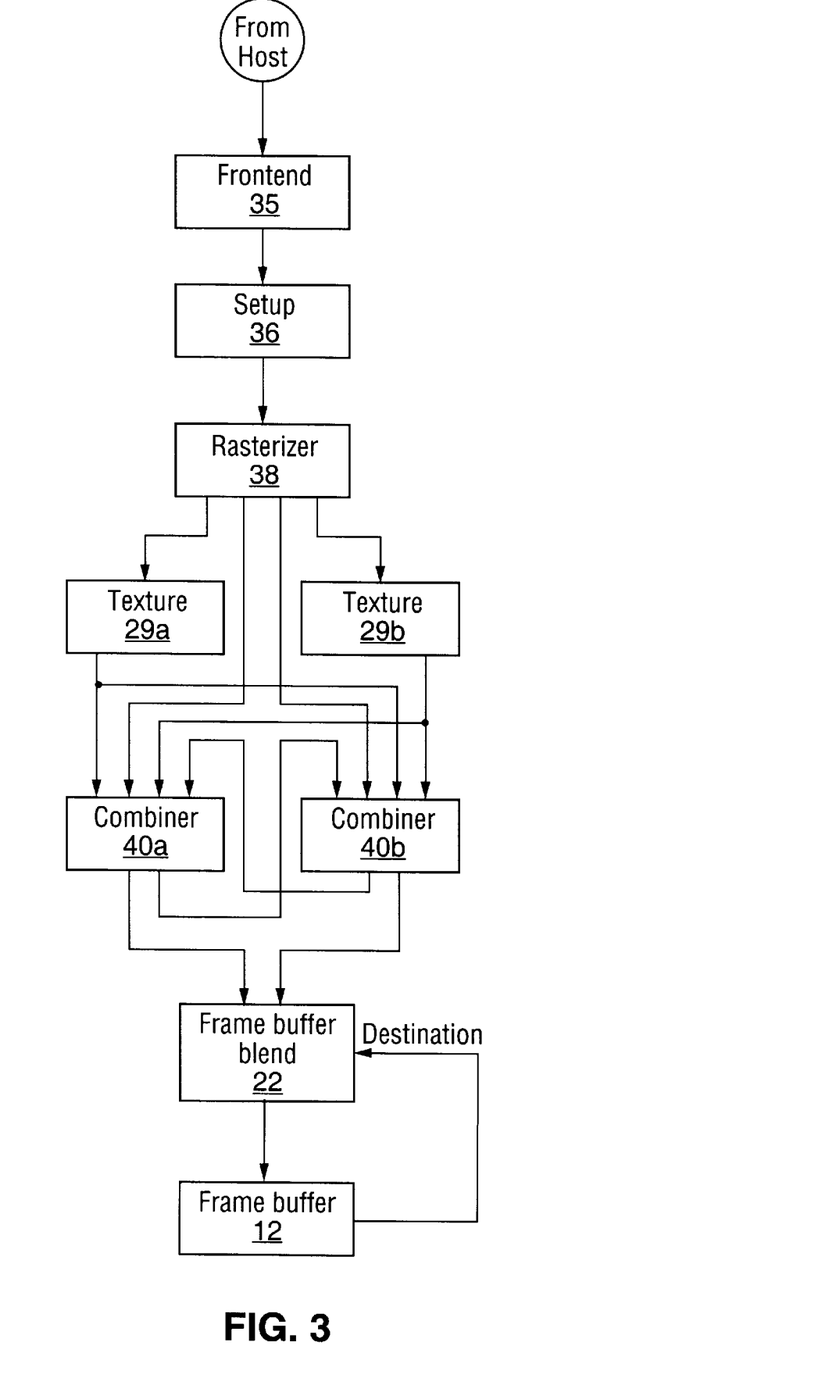
FIG. 3 is a block diagram illustrating a computer graphics pipeline designed in accordance with the present invention.

FIG. 3 is a block diagram illustrating a new graphics pipeline in accordance with the present invention. The new graphics pipeline includes front end, setup, and rasterizer stages 35, 36, and 38 which accomplish the functions described in detail above with respect to similar stages illustrated in FIG. 1. In addition, the pipeline includes a pair of texture stages 29a and 29b each of which is adapted to produce texture values in the manner described in detail above for individual textures being applied to a surface. In other embodiments, additional texture stages may be incorporated into the pipeline in the manner described herein.

The texture stage 29a is adapted to receive input signals which include texture coordinates at the pixels of a triangle being rendered for a first texture to be mapped to the triangle. The texture stage 29b is adapted to receive input signals which include texture coordinates at the pixels of the triangle being rendered for a second texture (which may be the same or a different texture) to be mapped to the same triangle. The outputs produced by the two texture stages 29a and 29b are two sequences of texture values defining two different sequences of textures to be mapped to the triangle the pixels for which are simultaneously being furnished by the rasterizer stage 28.

In addition to the multiple texture stages 39a and 39b, the pipeline of the present invention also includes two combiner stages 40a and 40b and does not include the texture blend stage or stages of the prior art. The combiner stages 40a and 40b each are capable of receiving input from a plurality of possible sources. For example, the combiner stages may each utilize as input, among other values, the output texture values produced by either of the texture stages 39a or 39b, the diffuse color output of the rasterizer stage 38, the output of the other combiner stage, and input signals defining various factors useful in combining various textures and colors together.

Figure 4:
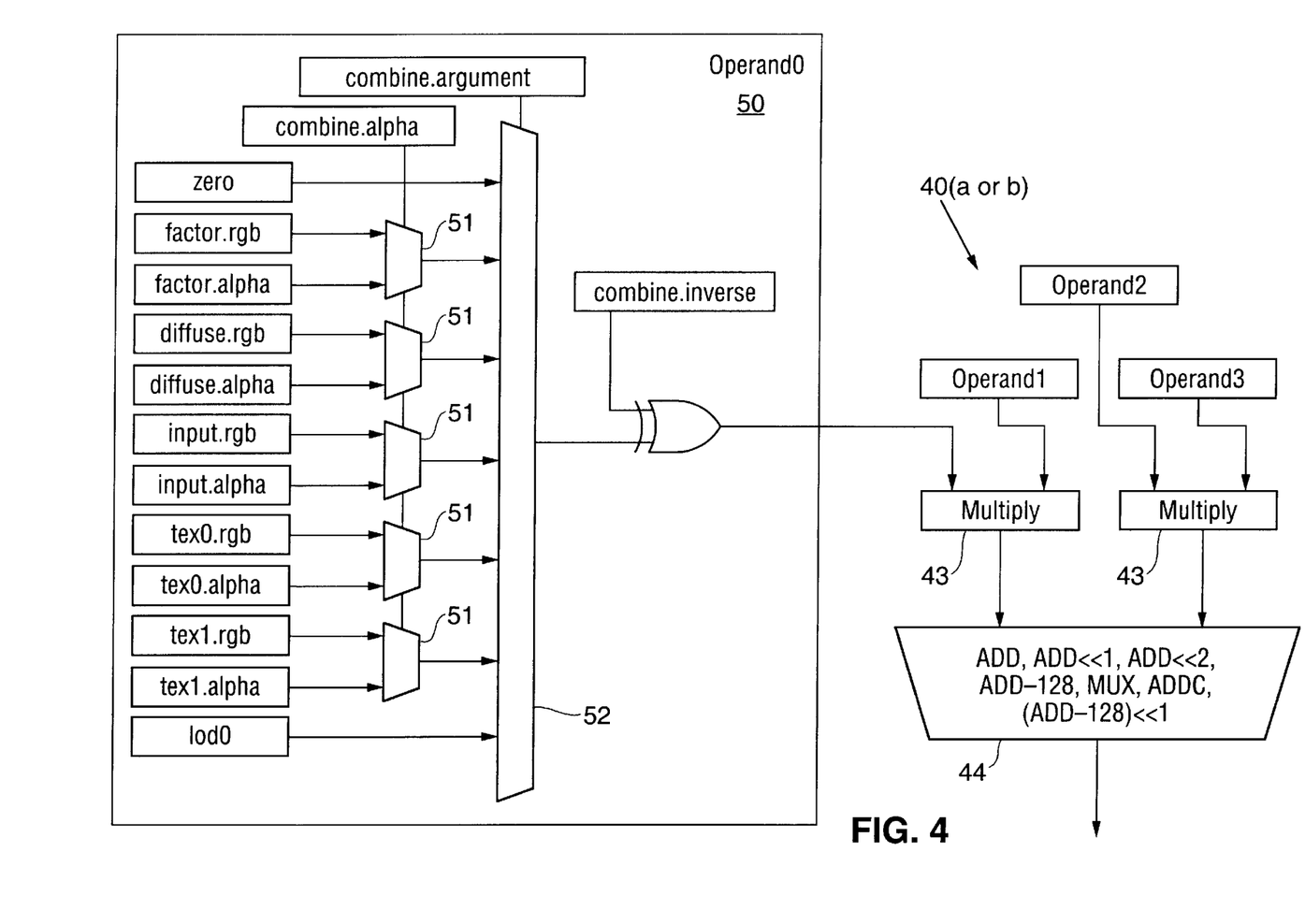
FIG. 4 is a block diagram illustrating a portion of the computer graphics pipeline of FIG. 3.

The combiner stages allow the diffuse color image furnished by the rasterizer stage 38 to be combined with each of at least two individual textures during the same pass through the pipeline. These stages also allow a plurality of other functions to be accomplished which greatly accelerate the operation of the pipeline. FIG. 4 is a block diagram describing the general form of the combiners 40a and 40b which should help to better illustrate their facilities. As FIG. 4 illustrates, each combiner includes a pair of multiply circuits 43 the output from each of which provides input to an add circuit 44. Each of the multiply circuits 43 is organized to multiply two input operands together and furnish the result as output to the add circuit 44. The add circuit 44 adds the results of the two multiplications accomplished by the multiply circuits 43 and accomplishes certain other operations. Any of the available operands may be selected to be multiplied by another and the result of this multiplication added to the result of another multiplication of two selectable operands. In contrast to prior art circuits in which a texture blend stage allows the blending of a texture and a single set of diffuse color pixels, the two input operands of each of the two multiply circuits may each be selected from any of a number of different sources among which are those described above. This allows operations to be accomplish in a single pass through the pipeline which could not be accomplished in any realistic manner by prior art circuitry.

As those skilled in the art will recognize, the typical operation by which a texture is mapped to a triangle utilizes a factor for selecting the amount of each diffuse pixel color to combine with the texture value color for that pixel. Typically, the factor used is the alpha value included with the texture information as a value between zero and one. One of the two elements to be combined (diffuse color or texture) is multiplied by the alpha value while the other is multiplied by one minus the alpha value. When these are added together, the result is the color value of the textured pixel. This assures that each color will be made up of some percentage of diffuse color and a remaining percentage of a modifying texture color as determined by the alpha (or other factor).

As may be seen, the combiners 40a and 40b are each adapted to easily handle the blending of textures with diffuse images in this manner. If the diffuse color pixels defining the triangle and an alpha value provided with the texture information are furnished as the two operands to one of the multipliers 43, the result is the diffuse pixel color multiplied by the alpha value. Similarly, if the texture values related to each of those pixels and one minus the alpha value are furnished as operands to the other of the two multipliers 43, the result is the texture value for each pixel multiplied by one minus alpha. Then the result may be added by the add circuit 44 to map the texture to the pixels of the triangle.

Although, this is one use of the combiners, various embodiments of the invention allow use in many other ways to accomplish operations not known to the prior art. FIG. 4 also illustrates in more detail an embodiment of the input stage 50 for one combiner. As may be seen, the input stage includes a plurality of multiplexors 51 each receiving input from two sources and furnishing output to another multiplexor 52. One of the multiplexors 51 receives the diffuse color values (DIFFUSE.RGB) and the diffuse alpha value (DIFFUSE.ALPHA), another multiplexor 51 receives first texture values (TEX0.RGB) and first texture alpha values (TEX0.ALPHA), and a third multiplexor 51 receives second texture values (TEX1.RGB) and second texture alpha values (TEX1.ALPHA). These operands are used in the manner discussed above. In addition, another multiplexor 51 receives factor values (FACTOR.RGB) and factor alpha values (FACTOR.ALPHA), and a final multiplexor 51 receives input values (INPUT.RGB) and input alpha values (INPUT.ALPHA). It should be understood that where the block diagram illustrates an input which is a color value such as diffuse color or a texture, the circuitry of the multiplexors is actually designed as three essentially identical circuits each designed to process one of the three individual red, green, and blue components of the color value separately. Moreover, as will be discussed later, a fourth circuit arrangement is also provided for accomplishing similar combinations of the alpha values which may be carried with each of the diffuse color values, texture values, factor values, and input values shown.

A COMBINE.ALPHA control signal controls the selection of the particular output furnished by each multiplexor 51 as input to the multiplexor 52. This COMBINE.ALPHA control signal selects for each multiplexor either the values themselves (those identified by .RGB) or the alpha values associated with the values (those identified by .ALPHA) as the input values to be furnished to the multiplexor 52 to be combined by one of the multipliers 43. Thus, the color values provided by the diffuse color input, the texture inputs, the factor value, and the undesignated input may be selected by the multiplexors 51. Alternatively, the plurality of alpha values associated with diffuse color, the different textures, the factor value, and the input value may be chosen.

It should be noted that a constant factor may be used in a computation to determine the weight to be given a diffuse color or a texture, in order to change its brightness, for example. The INPUT.RGB and INPUT.ALPHA values provide an additional undetermined input which a programmer may assign to any of a number of available sources. One manner in which this input may be used is to allow the result produced by one of the combiners to be used as a source for the other combiner.

The values selected by the multiplexors 51 are transferred to the multiplexor 52. In addition to the values selected by the multiplexors 51, the multiplexor 52 also receives individual input signals ZERO and LOD0. It should be noted that by selecting ZERO, one of the operands of a multiplication will be zero; thus, one result may be effectively eliminated as an input to the adder thereby allowing the adder to provide the sum of two multiplications or the result of either of the individual multiplications. On the other hand, by selecting LOD0, a particular level of detail is selected; the level of detail effectively causes a blend of texture values furnished as another input operand to the particular multiplier 43. Any of these values may be selected by the multiplexor 52 for multiplication by another input operand.

Thus, one of the alpha values, one of the many color values, ZERO, or LOD0 may be selected as an operand by the multiplexor 52.

The operands provided by the multiplexor 52 are selected in the manner determined by a COMBINE.ARGUMENT control signal which designates the particular multiplicand to be selected. Thus any of the color values, the alpha values, a factor, a level of detail, or zero may be transferred as an operand to a multiplier.

It should be noted that, as a generality, the arrangement provided is adapted to provide as an operand to one of the multipliers, either some form of color value or an alpha value. Thus, the arrangement is especially adapted to furnish one set of three operands by means of the three individual circuits providing operands for the multipliers which are the r,g,b color values and another set of three operands which are the alpha values by which these color values are to be blended. This allows one multiplier to produce an output with any set of color values which is the red color value multiplied by its alpha, the green color value multiplied by its alpha, and the blue color value multiplied by its alpha. These are the usual components of blending operations.

The result furnished by each multiplexor 52 at the input to each multiplier 43 may be inverted by an inverter 55 in response to a control signal COMBINE.INVERSE. In addition to other advantages, this allows a binary number result to be produced which is one minus the particular value, a result which is especially useful in providing the one minus alpha multiplier for color values and is used in other interpolation operations.

The output of the input stages 50 are transferred as operands to a multiplier 43. The multiplier 43 multiplies the two values together. This allows any of the operands to be multiplied by another. For example, any of the color operands such as diffuse color or a texture value may be multiplied by alpha, an inverted alpha value (one minus alpha), a constant factor, a level of detail, or some other input to provide an output value. The results produced by the two multipliers 43 are transferred to the adder 44.

The operations of adder 44 utilized with a particular embodiment are illustrated in FIG. 4. The adder has as a basic function the addition of the two multiplied results provided to it. Thus, if a diffuse color value and an alpha value are furnished to one multiplier, a texture value and inverse alpha to the other multiplier, the result produced by the adder 44 through a simple addition can be the color value for a pixel in which diffuse color is blended with the texture in accordance with the alpha value. This produces the pixel modified by the desired texture. It should be noted that any of the alpha values provided by any of the diffuse color or texture values may be used in the operation.

However, the adder in this embodiment of the invention is also adapted to provide a number of other output results which are the graphics pipelines of the prior art have not been capable of producing efficiently. For example, the adder may be used as a simple multiplexor to select from among the two input values provided. This allows the output from the combiner to be either the result of the addition of the two multiplications or either of the individual results of the multiplications. In addition, the adder allows the output produced to be shifted one or two bits to the left or one bit to the right. This allows the result to be doubled, quadrupled, or halved. These results are especially useful in modifying the intensity of pixels in the output result and in maintaining precision of binary calculations. A value of 128 may be subtracted from the results allowing the transfer between signed values and unsigned values thereby allowing the use of applications utilizing both signed and unsigned numbers. In the particular embodiment, a result from which 128 has been subtracted may also be shifted by one bit.

The combination of the selectable operands, the plurality of functions provided by the adder 44, and the ability to use the result of one combiner operation as input to the other allows the different input values to be manipulated to provide a myriad of different output values. Not only may the combiners may be utilized to blend a texture and a diffuse image and then to blend the result and a second texture, the combiners may be utilized to accomplish very complicated operations which typically require significantly more hardware and processing time in prior art circuits when those operations are possible at all.

For example, the factor input allows two textures to be combined with one another each as some percentage of a whole. By selecting the LOD input and a texture, a texture value may be multiplied by a value to provide the equivalent of a particular level of detail. The same texture value and a different LOD value as operands for the other multiplier provide a second level of detail. These may be combined by the adder. Any number of other operations typical to graphics accelerators may be accomplished rapidly through use of the combiners. Moreover, each of these operations may typically be accomplished in a single pass through the graphics pipeline of the invention.

Figure 5:
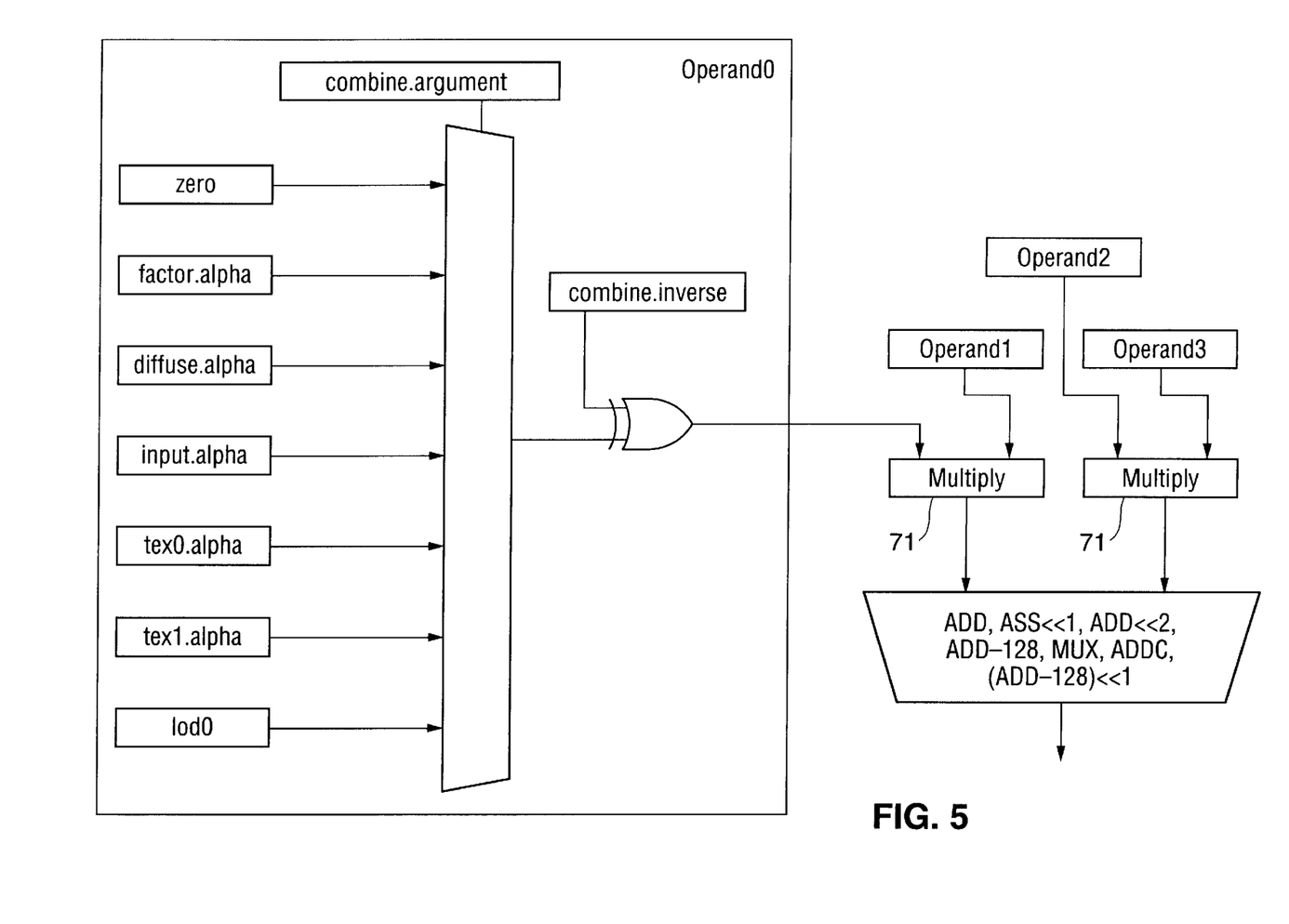
FIG. 5 is a block diagram illustrating another portion of the computer graphics pipeline of FIG. 3.

In addition to the three r,g,b processing paths for handling the color and texture values discussed with respect to FIG. 4, each of the combiners also includes a fourth path which is quite similar to each of the color paths. However, rather than allowing color and alpha values both to be used as operands, this path is designed to manipulate only the various alpha values. This path includes in one embodiment (shown in FIG. 5) a pair of multipliers 71 each capable of utilizing as operands all of the alpha value inputs which are available to the circuit of FIG. 4 as well as the LOD0 value and zero. The inverse of any of these values is also available as an operand. The operands are multiplied by the multipliers and the results furnished as output signals to an adder. The arrangement allows the alpha values to be separately manipulated is the manner described previously where that is a desirable operation. For example, this may be useful in providing a value to be used in furnishing specular lighting attributes. These attributes typically appear as white or colored highlight reflections from an image; the retention of a white value in a final image requires a different combination than the usual texture combination.

As will be understood, the embodiment of the present invention illustrated allows at least two individual textures to be mapped to a triangle during a single operation through the graphics pipeline. If more than two textures are to be mapped, then an embodiment having additional texture stages and combiners may be utilized. However, since adding additional combiners requires a significant increase in circuitry, the pipeline may be traversed more than once as an alternative. Even though the pipeline is traversed more than once, the operation is always at least twice as fast as prior art mapping operations for multiple textures.

Figure 6:
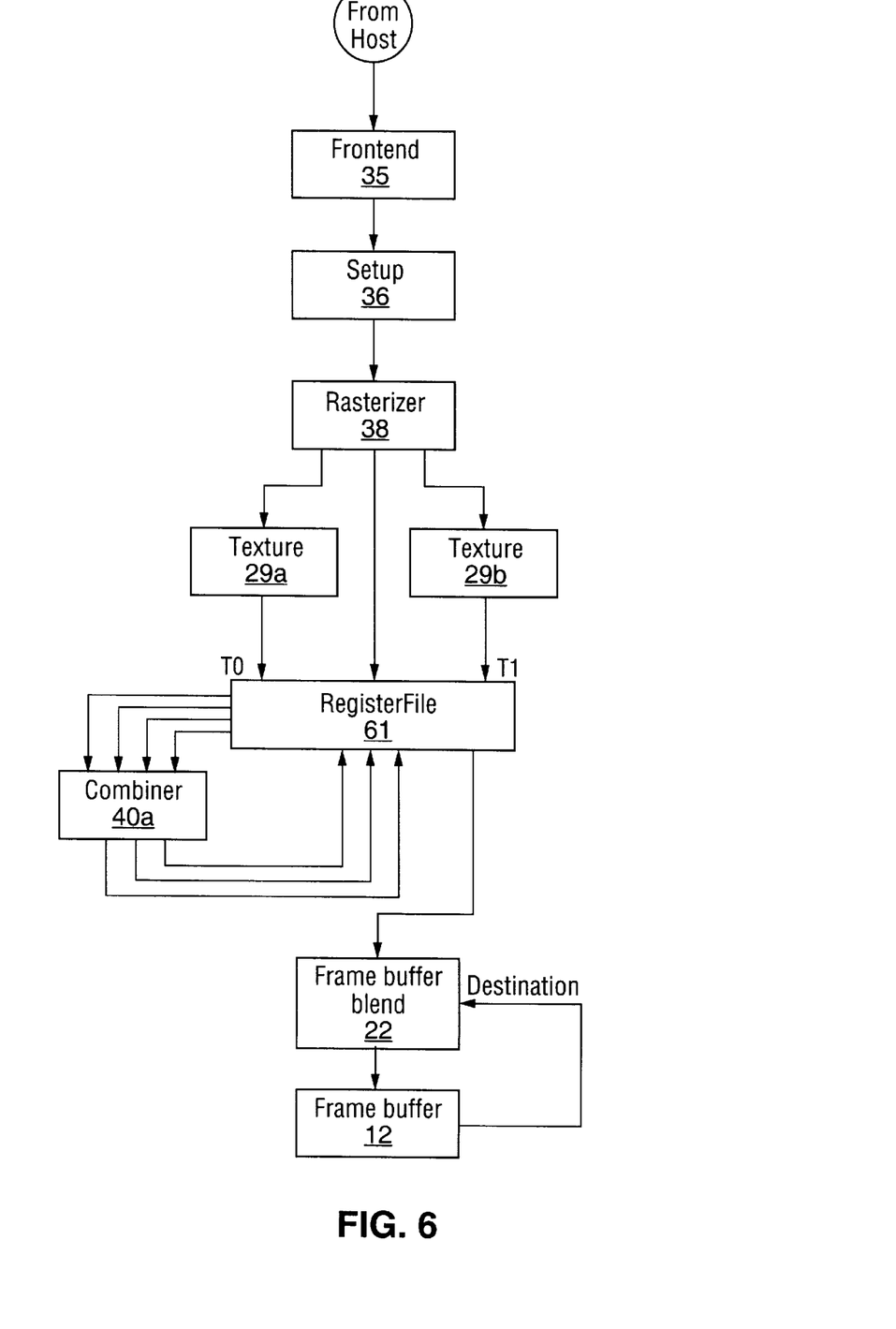
FIG. 6 is a block diagram illustrating another computer graphics pipeline designed in accordance with the present invention.

An additional embodiment of the invention shown in FIG. 6 utilizes significantly less hardware and provides significantly faster operation in cases where more than two textures are to be mapped to a surface. This embodiment utilizes a pair of texture stages (and may utilize more) but has only a single combiner stage. This embodiment provides a register file stage 61 as input to the combiner stage. The register file stage includes a plurality of registers in which operands furnished by the rasterizer and texture stages to be utilized by the combiner are placed. The operands used in any operation by the combiner are selected from these registers in accordance with control instructions (similar to those discussed with respect to FIGS. 4 and 5) provided by the program.

For example, a set of diffuse color values, two texture values, and two alpha values may be furnished to the registers of the register file 61 by the rasterizer 38 and the two textures stages 29a and 29b. Particular ones of the diffuse color values, one texture, and an alpha may be selected in response to control signals to combine the selected texture and the diffuse color in accordance with the alpha value. The resulting textured pixel color values are returned to available registers of the register file. The results of the first texture combining operation which have been placed in the registers may then be utilized for a second combining operation. A second instruction furnished by the program may select the results of the first operation, the second texture values, and a second alpha. Again the results are returned to available registers in the register file 61. In the particular embodiment, final results are transferred from the register file 61 to the frame buffer blend circuit 22 (possibly via intermediate circuitry).

By utilizing the registers in this manner as input sources for a combiner, the operation of combining two textures with a diffuse color image requires no more time than that necessary to register the results of the first operation before the second combiner operation may takes place. Moreover, the operation requires only the hardware used by a single combiner stage plus the few registers necessary to register the results of the combiner stage. The register file arrangement provides an especial advantage in reducing the size of the circuitry of the pipeline. It eliminates in large part the need for additional multiplexors because registering the inputs and selecting them by command eliminates the need to have hard wired inputs for each possible operation which it may be desirable for the combiner to perform. The register files also allows operand values to be changed thereby allowing a single combiner to carry out all of the functions of the two combiners utilized in the earlier described embodiment.

The single combiner with registered inputs essentially provides a looping operation. If the combiner is associated with more than two texture stages, the arrangement allows a very large plurality of textures to be mapped to the same surface in a single pass through the graphics pipeline, an operation which is much faster than with the embodiment of FIG. 3 any time more than two textures are mapped.

One particular embodiment in accordance with FIG. 6 provides eight inputs at the operand input stage to each multiplier from which a selection may be made for each operand for any operation. The particular combiner allows two instructions to be utilized to process two textures with the diffuse image. The combiner also includes circuitry for providing the additional operations described above with respect to the circuit of FIGS. 4 and 5.

The particular embodiment also provides circuitry which controls one operation which is especially advantageous in graphics operations. Many of the operations required in manipulating images utilize what is referred to as a "dot product." A dot product is the result produced when the individual values of two vectors are first multiplied by one another and the results are summed. A dot product is utilized in many equations which define the relations to one another of vectors in space. For example, the r/g/b components of vector are often each individually multiplied by the r,g,b components of another vector and the results summed to produce a scalar dot product.

The combiner is designed to produce dot products as one of its plurality of outputs thereby eliminating many of the steps typically necessary in the graphics pipeline. In order to produce a dot product, the individual channels of the combiner used for each of the r/g/b attributes are used to multiply sets of the individual r,g,b values together and the results are summed at the adder stage. The control functions to provide a dot product, because it is used so frequently, are wired into the circuitry.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A graphics pipeline comprising:
   a rasterizing stage configured to generate pixel coordinates, color values and texture coordinates for each of at least two pixels during each clock interval of the pipeline in response to data indicative of a single polygonal primitive, wherein the pixels define at least part of a surface to be displayed;
   a plurality of texture stages configured to generate, in response to the texture coordinates, texture values each defining a particular texture for at least one of the pixels; and
   a combiner stage, coupled to the rasterizing stage and the texture stages and configured to produce output values for at least two textured pixels during each clock interval of the pipeline, by combining a plurality of selectable input values to provide a result equivalent to a sum of products of sets of the input values, wherein the input values include at least a subset of the color values from the rasterizing stage and the texture values from the texture stages.

2. A graphics pipeline, comprising:
   a rasterizing stage producing color values and texture coordinates for pixels defining a surface to be displayed;
   a plurality of texture stages responding to the texture coordinates to generate texture values each defining a particular texture for pixels defining a surface to be displayed; and
   a combiner stage for combining a plurality of selectable input values to provide a result equivalent to a sum of products of sets of the input values, wherein the input values include at least a subset of the color values produced by the rasterizing stage and the texture values generated by the texture stages, and in which at least one of the input values to the combiner stage is a result provided by the combiner stage.

3. A graphics pipeline, comprising:
   a rasterizing stage producing color values and texture coordinates for pixels defining a surface to be displayed;
   a plurality of texture stages responding to the texture coordinates to generate texture values each defining a particular texture for pixels defining a surface to be displayed; and
   a combiner stage for combining a plurality of selectable input values to provide a result equivalent to a sum of products of sets of the input values, in which the input values to the combiner stage include diffuse color values, texture values furnished by a plurality of texture stages, proportions for combination of the selectable input values, and a result provided by the combiner stage.

4. A graphics pipeline as claimed in claim 1 in which the combiner stage includes a plurality of stages, each of the stages being coupled and configured for combining a plurality of the input values to provide said result.

5. A graphics pipeline, comprising:
   a rasterizing stage producing color values and texture coordinates for pixels defining a surface to be displayed;
   a plurality of texture stages responding to the texture coordinates to generate texture values each defining a particular texture for pixels defining a surface to be displayed; and
   a combiner stage for combining a plurality of selectable input values to provide a result equivalent to a sum of products of sets of the input values, in which the combiner stage includes a plurality of stages, each coupled and configured for combining the plurality of selectable input values to provide the result equivalent to the sum of products of sets of the input values, and in which the selectable input values to each of the plurality of stages of the combiner stage include diffuse color values, texture values furnished by the plurality of texture stages, proportions for combination of the selectable input values, and a result provided by the combiner stage.

6. A graphics pipeline, comprising:
   a rasterizing stage producing color values and texture coordinates for pixels defining a surface to be displayed;
   a plurality of texture stages responding to the texture coordinates to generate texture values each defining a particular texture for pixels defining a surface to be displayed; and
   a combiner stage for combining a plurality of selectable input values to provide a result equivalent to a sum of products of sets of the input values, in which the combiner stage includes a plurality of stages, each coupled and configured for combining the plurality of selectable input values to provide the result equivalent to the sum of products of sets of the input values, and in which each of the stages of the combiner stage includes means for selectably shifting said result.

7. A graphics pipeline, comprising:
   a rasterizing stage producing color values and texture coordinates for pixels defining a surface to be displayed;
   a plurality of texture stages responding to the texture coordinates to generate texture values each defining a particular texture for pixels defining a surface to be displayed; and
   a combiner stage for combining a plurality of selectable input values to provide a result equivalent to a sum of products of sets of the input values, in which the combiner stage includes a plurality of stages, each coupled and configured for combining the plurality of selectable input values to provide the result equivalent to the sum of products of sets of the input values, and in which each of the stages of the combiner stage includes means for selectably inverting said result.

8. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of stages, each coupled and configured for combining the plurality of selectable input values to provide the result equivalent to the sum of products of sets of the input values, and in which each of the stages of the combiner stage includes means for selecting a portion of said result.

9. A graphics pipeline as claimed in claim 8 in which each of the stages of the combiner stage includes means for selecting shifting a portion of said result.

10. A graphics pipeline as claimed in claim 8 in which each of the stages of the combiner stage includes means for selecting inverting a portion of said result.

11. A graphics pipeline as claimed in claim 1 in which the combiner stage includes a plurality of registers for storing selected ones of the input values.

12. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of registers for storing selected ones of the input values, and in which the selectable input values include diffuse color values, texture values furnished by the plurality of texture stages, proportions for combination of the selectable input values, and a result provided by the combiner stage.

13. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of registers for storing selected ones of the input values, and in which the combiner stage includes means for selectably shifting said result.

14. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of registers for storing selected ones of the input values, and in which the combiner stage includes means for selectably inverting said result.

15. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of registers for storing selected ones of the input values, and in which the combiner stage includes means for selecting a portion of said result.

16. A graphics pipeline, comprising:
a rasterizing stage producing color values and texture coordinates for pixels defining a surface to be displayed;
a plurality of texture stages responding to the texture coordinates to generate texture values each defining a particular texture for pixels defining a surface to be displayed; and
a combiner stage for combining a plurality of selectable input values to provide a result equivalent to a sum of products of sets of the input values, in which the combiner stage includes a plurality of registers for storing selected ones of the input values, and in which the combiner stage includes means for shifting a portion of said result.

17. A combiner stage for a computer graphics pipeline comprising a rasterizing stage producing color values and texture coordinates for pixels defining a surface to be displayed, and a plurality of texture stages configured to generate texture values in response to the texture coordinates, each of the texture values defining a particular texture for at least one of the pixels, said combiner stage comprising:
a plurality of input stages for selecting input values,
a plurality of multiplier stages for multiplying values selected by the input stages, and
an adder stage for combining results produced by the multiplier stages to provide an output value, wherein the input values to the input stages include said output value and at least a subset of the color values and the texture values.

18. A combiner stage for a computer graphics pipeline, comprising a plurality of input stages for selecting input values, a plurality of multiplier stages for multiplying the input values selected by the input stages, and an adder stage for combining results produced by multiplier stages to provide an output value, in which the input values include diffuse color values, texture values furnished by a plurality of texture stages, proportions for combination of the input values, and an output value provided by the combiner stage.

19. A combiner stage for a computer graphics pipeline as claimed in claim 17 further comprising a register stage for storing ones of the input values to be provided to the input stages.

20. A graphics pipeline, comprising:

a rasterizing stage configured to generate pixel coordinates, color values and texture coordinates for each of at least two pixels during each clock interval of the pipeline in response to data indicative of a single polygonal primitive, wherein the pixels define at least part of a surface to be displayed;

a plurality of texture stages configured to generate, in response to the texture coordinates, texture values each defining a particular texture for at least one of the pixels; and a combiner stage, coupled to the rasterizing stage and the texture stages and configured to produce output values for at least two textured pixels during each clock interval of the pipeline, by combining a plurality of selectable input values to provide a result equivalent to a sum of products of sets of the input values, wherein the input values include at least a subset of the color values from the rasterizing stage and the texture values from the texture stages, and wherein at least one of the input values is a result provided by the combiner stage.

21. The graphics pipeline of claim 20, wherein said subset of the color values includes diffuse color values, and the input values also include proportions for combination of the selectable input values.

* * * * *

UNITED STATES PATENT AND TRADEMARK OFFICE
CERTIFICATE OF CORRECTION

PATENT NO.    : 6,333,744 B1
DATED         : December 25, 2001
INVENTOR(S)   : David B. Kirk et al.

It is certified that error appears in the above-identified patent and that said Letters Patent is hereby corrected as shown below:

<u>Column 13,</u>
Line 20, "selecting" should be deleted.
Line 23, "selecting" should be deleted.

Signed and Sealed this

Fourteenth Day of May, 2002

*Attest:*

*Attesting Officer*

JAMES E. ROGAN
*Director of the United States Patent and Trademark Office*